(12) United States Patent
Zhou

(10) Patent No.: US 11,490,156 B2
(45) Date of Patent: Nov. 1, 2022

(54) DELAY CONTROL METHOD, DELAY CONTROL APPARATUS, TERMINAL DEVICE AND STORAGE MEDIUM

(71) Applicant: BEIJING DAJIA INTERNET INFORMATION TECHNOLOGY CO., LTD., Beijing (CN)

(72) Inventor: Chao Zhou, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/057,048

(22) PCT Filed: Sep. 3, 2019

(86) PCT No.: PCT/CN2019/104200
§ 371 (c)(1),
(2) Date: Nov. 19, 2020

(87) PCT Pub. No.: WO2020/088090
PCT Pub. Date: May 7, 2020

(65) Prior Publication Data
US 2021/0250644 A1 Aug. 12, 2021

(30) Foreign Application Priority Data
Oct. 31, 2018 (CN) .......................... 201811283473.1

(51) Int. Cl.
*H04N 21/44* (2011.01)
*H04N 21/24* (2011.01)
(Continued)

(52) U.S. Cl.
CPC ... *H04N 21/44004* (2013.01); *H04N 21/2402* (2013.01); *H04N 21/2662* (2013.01); *H04N 21/64738* (2013.01)

(58) Field of Classification Search
CPC ......... H04N 21/44004; H04N 21/2402; H04N 21/2662; H04N 21/64738; H04N 21/44209; H04N 21/4331; H04N 21/6582
See application file for complete search history.

(56) References Cited

U.S. PATENT DOCUMENTS

2011/0078324 A1* 3/2011 Honma ............ H04N 21/42661
709/231
2011/0258336 A1* 10/2011 Salomons ............ H04L 65/612
709/231
(Continued)

FOREIGN PATENT DOCUMENTS

CN 1627755 A 6/2005
CN 101094047 A 12/2007
(Continued)

OTHER PUBLICATIONS

Chinese Office Action dated Apr. 22, 2020 from Chinese Patent Application No. 201811283473.1.
(Continued)

*Primary Examiner* — Robert J Hance
(74) *Attorney, Agent, or Firm* — Foley & Lardner LLP

(57) ABSTRACT

Disclosed are a delay control method, a delay control apparatus, a terminal device and a storage medium. The delay control method comprises: initializing a cached data amount, and setting an initial delay threshold value; acquiring real-time cached data of a client, and determining a network status of the client according to same; and adjusting the current delay threshold value according to the network status. According to the delay control method, a network status of a user end is determined according to cached data of the user end, and a delay time is adjusted, so that in a large-scale live broadcast scenario, a player can dynamically control, according to the network status of each user, a delay (Continued)

time of each user end in real time, and improve the viewing experience of user.

17 Claims, 4 Drawing Sheets

(51) Int. Cl.
*H04N 21/2662* (2011.01)
*H04N 21/647* (2011.01)

(56) References Cited

U.S. PATENT DOCUMENTS

| | | | |
|---|---|---|---|
| 2012/0047280 A1* | 2/2012 | Park | H04L 65/80 |
| | | | 709/231 |
| 2012/0297081 A1* | 11/2012 | Karlsson | H04N 21/440227 |
| | | | 709/231 |
| 2015/0254056 A1 | 9/2015 | Walker et al. | |
| 2016/0353160 A1* | 12/2016 | Huang | H04N 21/4383 |

FOREIGN PATENT DOCUMENTS

| | | | | |
|---|---|---|---|---|
| CN | 101917342 A | | 12/2010 | |
| CN | 102355462 A | | 2/2012 | |
| CN | 103051955 A | | 4/2013 | |
| CN | 103259803 A | | 8/2013 | |
| CN | 103533451 A | | 1/2014 | |
| CN | 103929370 A | | 7/2014 | |
| CN | 104133880 A | | 11/2014 | |
| CN | 104333778 A | | 2/2015 | |
| CN | 102118244 B | | 4/2015 | |
| CN | 105847381 A | | 8/2016 | |
| CN | 107205160 A | * | 9/2017 | |
| CN | 108092787 A | | 5/2018 | |
| CN | 108123947 A | | 6/2018 | |
| CN | 109327716 A | | 2/2019 | |
| KR | 100787314 B1 | * | 12/2007 | |
| WO | WO-2011150657 A1 | * | 12/2011 | ......... H04N 21/2387 |
| WO | WO-2016/122225 A1 | | 8/2016 | |
| WO | WO-2016/207688 A1 | | 12/2016 | |

OTHER PUBLICATIONS

Chinese Office Action dated Dec. 4, 2019 from Chinese Patent Application No. 201811283473.1.
International Search Report and Written Opinion dated Nov. 19, 2019, from application No. PCT/CN2019/104200.

* cited by examiner

600

DELAY CONTROL METHOD, DELAY CONTROL APPARATUS, TERMINAL DEVICE AND STORAGE MEDIUM

CROSS-REFERENCE TO RELATED APPLICATION

This application is based on International Application No. PCT/CN2019/104200, filed on Sep. 3, 2019, which is based on and claim priority of the Chinese Patent Application No. 201811283473.1, entitled 'Method for Controlling Delay, Apparatus for Controlling Delay, and Computer-Readable Storage Medium' filed on Oct. 31, 2018, the disclosure of which is herein incorporated by reference in its entirety.

TECHNICAL FIELD

The disclosure is related to the field of computer software applications, and more particularly, to a method for controlling a delay, an apparatus for controlling a delay, a terminal device and a storage media.

BACKGROUND

With continuous development of Internet technology, the application of streaming media technology has become more and more extensive. In short, streaming media is a service method allowing users to watch multimedia programs while said programs are being downloading via the Internet. There is no need to take a long time to download an entire video file to a local device, and a cached space is needed to store only a few seconds of the video file, to allow the video file to be played. The subsequent data will be continuously input into the cached space to maintain continuous play.

In the current live broadcast scheme, when using streaming media services, a certain amount of data is generally cached on a client-side in order to cope with jitter of bandwidth and to reduce a stalling rate. This approach causes a certain delay. Further, for all users, an amount of cached data is generally preset in advance, that is, minimum delay for all users is predefined, and will not change dynamically during the process of watching the live broadcast. However, it is very difficult to choose the amount of preset cached data. In the case of there is too much cached data amount, for users with good network, an extra-large delay will be introduced; and in the case of the cached data amount is too small, for users with insufficient network status, it is difficult to achieve the purpose of avoiding bandwidth jitter, which leads to stalling.

SUMMARY

According to some arrangements, there is provided a method for controlling a delay, the method includes initializing an amount of cached data, and setting an initial delay threshold. The method includes acquiring real-time cached data of a client-side and determining a network status of the client-side according to the real-time cached data. The method includes adjusting a current delay threshold according to the network status.

According some arrangements, there is provided an apparatus for controlling a delay, the apparatus includes an initialization module configured to initialize an amount of cached data and set an initial delay threshold. The apparatus includes a data acquisition module configured to acquire real-time cached data of a client-side and determine a network status of the client-side according to the real-time cached data. The apparatus includes an adjustment module configured to adjust a current delay threshold according to the network status.

According to some arrangements, there is provided a terminal device, the terminal device includes a processor and a memory for storing instructions executable by the processor. When one or more programs are executed by the one or more processors, the processor is configured to enable the processor to implement any one of the methods for controlling a delay described above.

According to some arrangements, there is provided computer-readable storage medium having a computer instruction stored thereon. When being executed, the computer instruction implements any one of the methods for controlling a delay described above.

It should be understood that the above general description and the following detailed description are only example and explanatory, and do not limit the disclosure.

BRIEF DESCRIPTION OF THE DRAWINGS

The drawings herein are incorporated into the specification and constitute a part of the specification, show arrangements that conform to the disclosure, and are used together with the specification to explain the principle of the disclosure.

DETAILED DESCRIPTION

Herein, arrangements will be described in detail, and examples thereof are shown in the accompanying drawings. When the following description refers to the drawings, unless otherwise indicated, the same numbers in different drawings indicate the same or similar elements. The implementations described in the following example arrangements do not represent all implementation consistent with the disclosure. On the contrary, they are only examples of apparatus and methods consistent with some aspects of the application as detailed in the appended claims.

Figure 1:
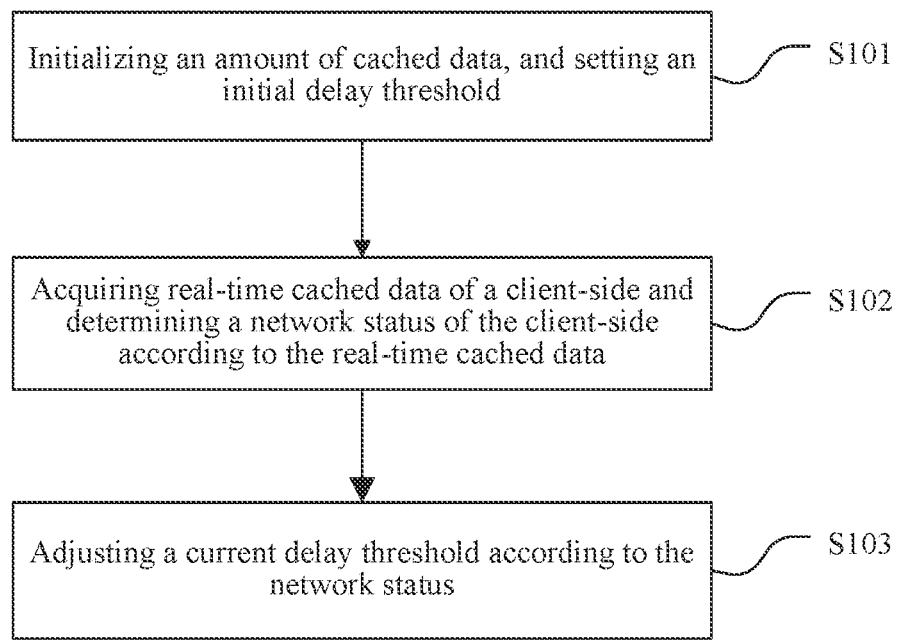
FIG. 1 is a flowchart showing a method for controlling a delay according to an arrangement of the disclosure.

FIG. 1 is a flowchart showing a method for controlling a delay according to an arrangement of the disclosure. The method for controlling a delay specifically includes the following blocks.

In a block S101, an amount of cached data is initialized, and an initial delay threshold is set. In the arrangements of the disclosure, the amount of cached data refers to a length of playing time supported by the cached data, so the amount of cached data can be measured by the length of time.

In a block S102, real-time cached data of a client-side is obtained and a network status of the client-side is determined according to the real-time cached data.

In a block S103, a current delay threshold is adjusted according to the network status.

During a live broadcast, a certain amount of data is generally cached on the client-side to avoid network jitter, and the initial amount of cached data is recorded as T (in units of seconds), but it will cause a certain delay. For example, a network anchor A pushes streaming to a service S in a live broadcast, at least T seconds of data of the service S is stored at a server-side, and a viewer B watches the live broadcast of the network anchor A and pulls streaming from the service S. If current time is denoted as t, then the service S sends all the data to the viewer B after time (t-T). Therefore, pictures viewed by viewer B are delayed by T seconds relative to the network anchor A.

Firstly, the amount of cached data is initialized, and the initial delay threshold T is set. The initial delay threshold T is used as a current threshold, and then the network status of client-side is determined based on the real-time cached data of client-side. For example, at the client-side where viewer B is located, statistic about the cached data is continuously made, for example, making a statistic every 500 ms. In an arrangement, the cached data includes a video bitrate, an average download bandwidth, and an amount of cached data in each sliding window. Upon a size of the cached data in one sliding window is recorded, a window size is set to W (for example, W=60), a time interval is set to 500 ms, that is, a cache status of 30 seconds of history is recorded. Among them, the video bitrate refers to a target bitrate of video encoding/transcoding; the download bandwidth is an estimated actual download bandwidth, and any bandwidth estimation scheme can be adopted; a cache size is an amount of data that can be used to play in a player, which is measured in seconds.

The arrangements of the disclosure dynamically control size of current cache mainly based on change of the cache size and change of the bandwidth, which is in dynamically controlling a delay of user and reducing a stalling rate. In an arrangement, the network status can be determined according to a multiple relationship between a minimum amount of cached data in each sliding window and the current delay threshold, and a multiple relationship between the average download bandwidth and the video bitrate.

The current delay threshold is adjusted according to the network status. A minimum delay at the client-side (i.e. user-side) is directly determined by the value of T. If user's network is good enough and no stall occurs during the viewing process, then the delay at the client-side will remain as T, that is, it is stabilized at T. If user's network is not good and stall occurs during the viewing process, then the delay at the client-side will increase, and in this case, the delay will be reduced to T again by skipping frames or chasing frames.

In the arrangements of this disclosure, the network status of the client-side is determined according to the cached data at the client-side, and delay time is adjusted accordingly, so that in a large-scale live broadcast scenario, according to the network status of each client-side, the delay time of the each client-side can be controlled in real time and dynamically. As such, the stalling rate can be reduced, which improves the user's experience of viewing.

Figure 2:
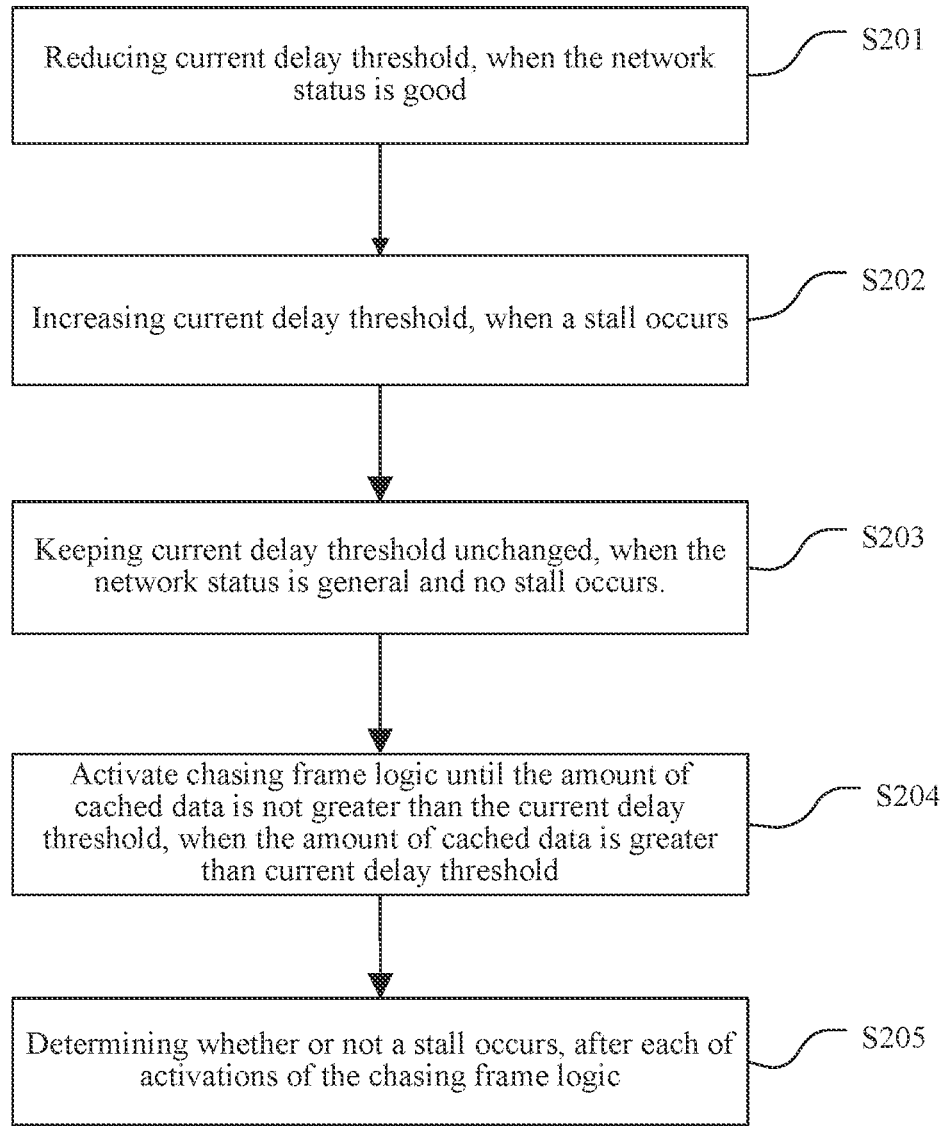
FIG. 2 is a flowchart showing adjusting a delay threshold according to an arrangement of the disclosure.

FIG. 2 is a flowchart showing adjusting a delay threshold according to an arrangement of the disclosure.

In a block S201, the current delay threshold is reduced, in response to determining that the network status is good.

In a block S202, the current delay threshold is increased, in response to determining that one or more stalls occur;

In a block S203, the current delay threshold is kept unchanged, in response to determining that the network status is general and no stall occurs.

In a block S204, chasing frame logic is activated until the amount of cached data is not greater than the current delay threshold, in response to determining that the amount of cached data is greater than the current delay threshold.

In a block S205, after each of activations of the chasing frame logic, it is determined whether one or more stalls occur.

The process for adjusting the delay threshold shown in FIG. 2 is an optimization solution for adjusting the delay threshold in block S103 of FIG. 1. Blocks S201 to S203 are judgments made on overall adjustment of the delay threshold according to the network status.

Firstly, the network status of current client-side is evaluated according to the cached data. The cached data includes a video bitrate v_rate, an average download bandwidth bw_estimate, and an amount of cached data in each sliding window W. The network status may be determined according to a multiple relationship between a minimum amount of cached data in each sliding window W and the current delay threshold, and a multiple relationship between the average download bandwidth bw_estimate and the video bitrate v_rate.

For example, in response to determining that the minimum amount of cached data in each sliding window W is greater than or equal to a set multiple of the current delay threshold, and the average download bandwidth bw_estimate is greater than a set multiple of the video bitrate v_rate, the network status is considered as good; otherwise, the network status is considered as general. For example, in the case of the current delay threshold is T1, in response to determining that the minimum amount of cached data in the sliding window W is not less than 0.95*T1, and the average download bandwidth bw_estimate is greater than 1.2 times the video bitrate v_rate, then the network is considered as good since both conditions mentioned above are met.

The comparison between the average download bandwidth bw_estimate and the video bitrate v_rate can be divided into two situations: for a single bitrate video, it is necessary to satisfy that the average download bandwidth bw_estimate is greater than the set multiple of the video bitrate v_rate (for example, 1.2 times the video bitrate v_rate), while for a multi-bitrate video, not only needs to satisfy that the average download bandwidth bw_estimate is greater than the set multiple of the video bitrate v_rate (for example, 1.2 times the video bitrate v_rate), but also needs to satisfy that a minimum video bitrate in each sliding window is equal to a maximum available video bitrate.

After setting the conditions, the network status is determined based on the collected real-time cached data. In response to determining that the network status is good, the current delay threshold T1 is reduced; in response to determining that one or more stalls occur, the current delay threshold T1 is increased; and in response to determining that the network status is general and no stall occurs, the current delay threshold T1 is kept unchanged.

In the arrangements of the disclosure, the method for controlling the delay further includes: presetting a delay adjustment time delta, and adjusting the size of the current delay threshold T1 according to the delay adjustment time delta.

For example, in response to determining that the cached data meets the above two conditions at the same time, it is considered that the network is in good condition. At this point, the current delay threshold T1 is reduced, and the larger one or bigger one of the minimum amount of cached data in each sliding window W and a difference between the current delay threshold T1 and a multiple of the delay adjustment time delta is selected as an adjusted delay threshold. The current delay threshold T1 can be updated by using the following formula, to get the adjusted delay threshold: T1=max(T1-delta, T_min). T_min is the minimum amount of cached data in each sliding window W, which is measured in the units of seconds, and 0<delta<T1, for example, delta=0.5 seconds.

In response to determining that a stall occurs, the current delay threshold T1 is increased, a stalling period t, i.e. duration of stalling, is recorded, and the smaller one of the maximum amount of cached data in each sliding window W and a sum between the current delay threshold T1 and a multiple of the delay adjustment time delta is selected as an adjusted delay threshold. The current delay threshold T1 can be updated by using the following formula, to get the adjusted delay threshold: T1=min(T1+2*de/ta, T_max). T_max is the maximum amount of cached data in each sliding window W, which is measured in the units of seconds. In block S204, in response to determining that the amount of cached data is greater than the current delay threshold, the chasing frame logic is activated until the amount of cached data is not greater than the current delay threshold. For example, in the block S201, in response to determining that the network status is good, the current delay threshold is lowered so that the amount of cached data is greater than the current delay threshold. At this point, the video player initiates the chasing frame logic, and then chasing frame is started until the amount of cached data is not greater than the current delay threshold. At any time during video playing, as long as the amount of cached data is greater than the current delay threshold, the chasing frame logic is activated.

In the block S205, after each of activations of the chasing frame logic, it is determined whether a stall occurs. After chasing frame, the delay is reduced. At this point, it is judged whether the video playing is stalled. If a stall phenomenon occurs, return to block S202 to increase the current delay threshold; if no stall occurs, keep the current status for a period of time, and then return to block S103 in FIG. 1 again to re-determine the network status.

In the arrangements of the disclosure, the current delay threshold of the client-side is adjusted according to the network status. In response to determining that the network status is good, the current delay threshold is lowered, and in response to determining that one or more stalls occur, the current delay threshold is increased, so that the user can follow up the live broadcast situation in time in response to determining that the network is good. In response to determining that one or more stalls occur, the cache is adjusted in time to reduce the stalling rate, improve the viewing experience, and achieve real-time adjustment to ensure the user's viewing quality.

Figure 3:
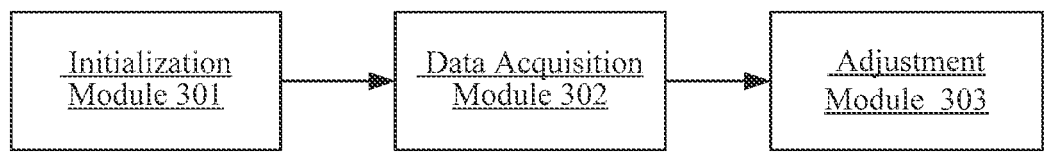
FIG. 3 is a schematic diagram showing an apparatus for controlling a delay according to an arrangement of the disclosure.

FIG. 3 is a schematic diagram showing an apparatus for controlling a delay according to an arrangement of the disclosure. The apparatus for controlling the delay includes an initialization module 301, a data acquisition module 302, and an adjustment module 303.

The initialization module 301 is configured to initialize an amount of cached data and set an initial delay threshold.

The data acquisition module 302 is configured to acquire real-time cached data of a client-side and determine a network status of the client-side according to the real-time cached data.

The adjustment module 303 is configured to adjust a current delay threshold according to the network status.

The entire system of the apparatus for controlling a delay of the arrangements of the disclosure can monitor the network status of the client-side in real time, and correspondingly adjust the current delay threshold and the amount of cached data according to the network status, so that the delay of the client-side can be dynamically controlled during live broadcast, and the viewing experience of the client can be improved.

Figure 4:
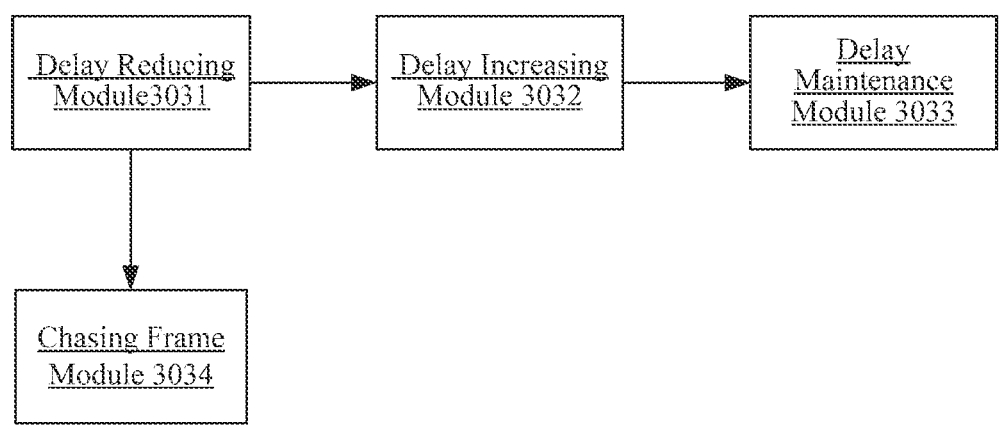
FIG. 4 is a schematic diagram showing an adjustment module in an apparatus for controlling a delay according to an arrangement of the disclosure.

FIG. 4 is a schematic diagram showing an adjustment module in an apparatus for controlling a delay according to an arrangement of the disclosure.

The adjustment module 303 includes a delay reducing module 3031, a delay increasing module 3032, a delay maintenance module 3033, and a chasing frame module 3034.

The delay reducing module 3031 is configured to reduce the current delay threshold in response to determining that the network status is good.

The delay increasing module 3032 is configured to increase the current delay threshold in response to determining that one or more stalls occur;

The delay maintenance module 3033 is configured to keep the current delay threshold unchanged in response to determining that the network status is general and no stall occurs.

In the arrangements of the disclosure, the chasing frame module 3034 is configured to activate chasing frame logic until the amount of cached data is not greater than the current delay threshold, in response to determining that the amount of cached data is greater than the current delay threshold. For example, in response to determining that the delay reducing module 3031 reduces the current delay threshold, the amount of cached data will be greater than the current delay threshold, and at this point, the system activates the chasing frame logic to quickly adjust the delay.

In the arrangements of the disclosure, the adjustment module 303 further includes a stall determination module (not shown in the figure), which is configured to determine whether or not a stall occurs every time the chasing frame logic is activated. If a stall occurs, the delay threshold can be adjusted by the delay increasing module 3032.

In the arrangements of the disclosure, the cached data includes a video bitrate, an average download bandwidth, and an amount of cached data in each sliding window.

In the arrangements of the disclosure, the data acquisition module 302 is configured to determine the network status, according to a multiple relationship between a minimum amount of cached data in each sliding window and the current delay threshold, and a multiple relationship between the average download bandwidth and the video bitrate.

In the arrangements of the disclosure, the data acquisition module 302 is configured to: determine that the network status is good, if the minimum amount of cached data in each sliding window is greater than or equal to a set multiple of the current delay threshold, and the average download bandwidth is greater than a set multiple of the video bitrate; otherwise, determine the network status as general.

In the arrangements of the disclosure, the average download bandwidth is greater than a set multiple of the video bitrate comprising:

for a single bitrate video, the average download bandwidth is greater than the set multiple of the video bitrate;

for a multi-bitrate video, a minimum video bitrate in each sliding window is equal to a maximum available video bitrate and the average download bandwidth is greater than the set multiple of the video bitrate.

In the arrangements of the disclosure, the adjustment module 303 is further configured to preset a delay adjustment time, and adjust the current delay threshold according to the delay adjustment time.

In the arrangements of the disclosure, the adjustment module 303 is configured to:

select a larger one of the minimum amount of cached data in each sliding window and a difference between the current delay threshold and a multiple of the delay adjustment time as an adjusted delay threshold, in response to determining that the current delay threshold is reduced;

select a smaller one of a maximum amount of cached data in each sliding window and a sum between the current delay threshold and a multiple of the delay adjustment time as the adjusted delay threshold, in response to determining that the current delay threshold is increased.

Regarding the apparatus for controlling a delay in the foregoing arrangement, since the function of each module therein has been described in detail in the foregoing delay control method arrangement, a relatively brief description has been made.

Figure 5:
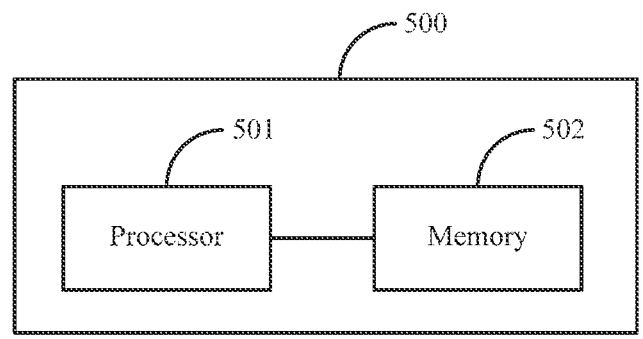
FIG. 5 is a block diagram showing a terminal device for executing a method for controlling a delay according to an arrangement of the disclosure.

As shown in FIG. 5, an arrangement of the disclosure further provides a terminal device 500. The terminal device 500 includes a processor 501 and a memory 502 for storing instructions executable by the processor 501. The processor 501 is configured to when the one or more programs are executed by the one or more processors, enable the one or more processors to implement the following processes. The processor 501 is configured to initialize an amount of cached data, and set an initial delay threshold. The processor 501 is configured to acquire real-time cached data of a client-side and determine a network status of the client-side according to the real-time cached data. The processor 501 is configured to adjust a current delay threshold according to the network status.

In the arrangements of the disclosure, in response to determining that the current delay threshold is adjusted according to the network status, the one or more processors are configured to:

reduce the current delay threshold, in the case of the network status is good;

increase the current delay threshold, in the case of a stall occurs; and keep the current delay threshold unchanged, in the case of the network status is general and no stall occurs.

In the arrangements of the disclosure, the one or more processors are configured to: activate chasing frame logic until the amount of cached data is not greater than the current delay threshold, in response to determining that the amount of cached data is greater than the current delay threshold.

In the arrangements of the disclosure, the one or more processors are further configured to determine whether or not a stall occurs, after each of activations of the chasing frame logic.

In the arrangements of the disclosure, the cache data includes a video bitrate, an average download bandwidth, and an amount of cached data in each sliding window.

In the arrangements of the disclosure, the one or more processors are configured to: according to a multiple relationship between a minimum amount of cached data in each sliding window and the current delay threshold, and a multiple relationship between the average download bandwidth and the video bitrate, determine the network status.

In the arrangements of the disclosure, the one or more processors are configured to: if the minimum amount of cached data in each sliding window is greater than or equal to a set multiple of the current delay threshold, and the average download bandwidth is greater than a set multiple of the video bitrate, determine that the network status is good; otherwise, determine the network status as general.

In the arrangements of the disclosure, the average download bandwidth is greater than a set multiple of the video bitrate comprising:

for a single bitrate video, the average download bandwidth is greater than the set multiple of the video bitrate;

for a multi-bitrate video, a minimum video bitrate in each sliding window is equal to a maximum available video bitrate and the average download bandwidth is greater than the set multiple of the video bitrate.

In arrangements of the disclosure, the one or more processors are configured to preset a delay adjustment time, and adjust the current delay threshold according to the delay adjustment time.

In arrangements of the disclosure, the one or more processors are configured to:

select a larger one of the minimum amount of cached data in each sliding window and a difference between the current delay threshold and a multiple of the delay adjustment time as an adjusted delay threshold, in the case of the current delay threshold is reduced;

select a smaller one of a maximum amount of cached data in each sliding window and a sum between the current delay threshold and a multiple of the delay adjustment time as the adjusted delay threshold, in the case of the current delay threshold is increased.

Figure 6:
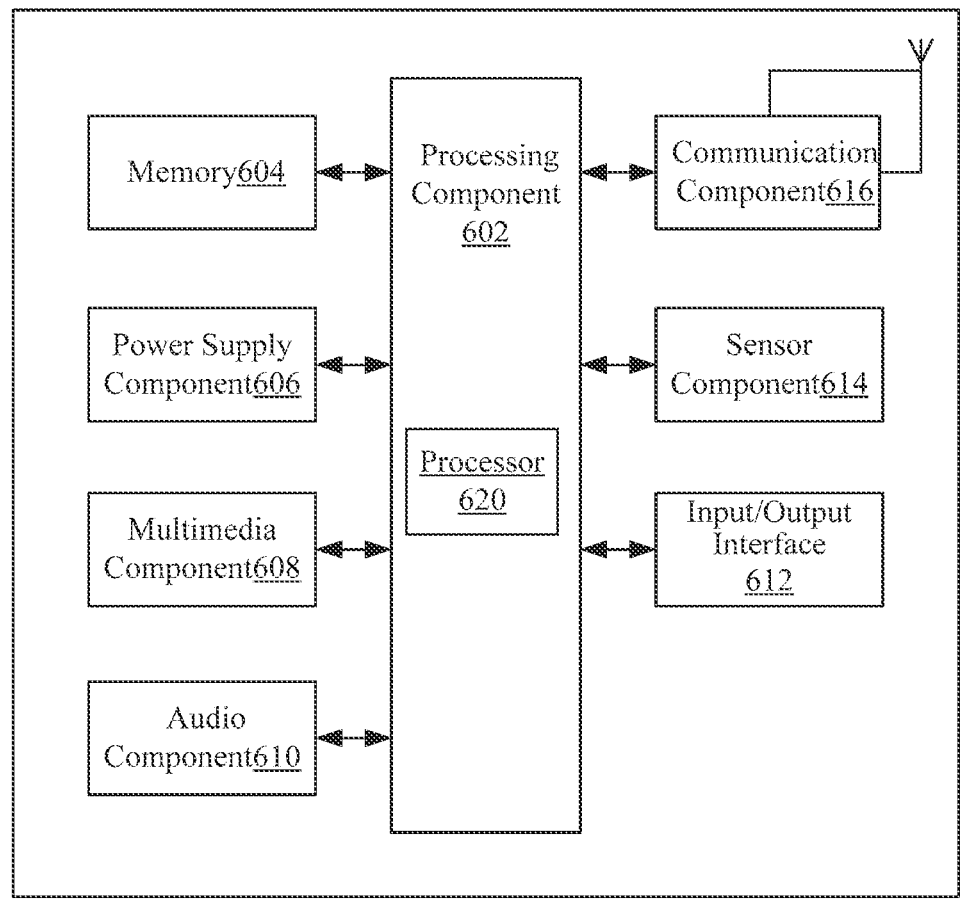
FIG. 6 is a block diagram showing an electronic device for executing a method for controlling a delay according to an arrangement of the disclosure.

FIG. 6 is a block diagram showing an electronic device 600 used for the above delay control method according to an example arrangement. For example, the electronic device 600 may be a mobile phone, a computer, a digital broadcasting terminal, a messaging device, a game console, a tablet device, a medical device, a fitness device, a personal digital assistant, etc.

Referring to FIG. 6, the electronic device 600 may include one or more of the following components: a processing component 602, a memory 604, a power supply component 606, a multimedia component 608, an audio component 610, and an input/output (I/O) interface 612, a sensor component 614, and a communication component 616.

The processing component 602 generally controls overall operations of the electronic device 600, such as operations associated with display, telephone calls, data communications, camera operations, and recording operations. The processing component 602 may include one or more processors 620 to execute instructions, so as to complete all or part of the blocks of the foregoing method. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support operations in the electronic device 600. Examples of these data include instructions for any application or method operating on the electronic device 600, contact data, phone book data, messages, pictures, videos, etc. The memory 604 may be implemented by any type of volatile or non-volatile storage device or a combination thereof, such as Static Random-Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk.

The power supply component 606 provides power for various components of the electronic device 600. The power supply component 606 may include a power supply management system, one or more power supplies, and other components associated with the generation, management, and distribution of power for the electronic device 600.

The multimedia component 608 includes a screen that provides an output interface between the electronic device 600 and the user. In some arrangements, the screen may include a Liquid Crystal Display (LCD) and a Touch Panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of a touch operation or a slide operation, but also detect duration and pressure related to the touch or slide operation. In the arrangements of the disclosure, the multimedia component 608 includes a front camera and/or a rear camera. When the electronic device 600 is in an operation mode, such as a shooting mode or a video mode, the front camera and/or the rear camera can receive external multimedia data. Each front camera and rear camera can be a fixed optical lens system or have focal length and optical zoom ability.

The audio component 610 is configured to output and/or input audio signals. For example, the audio component 610 includes a microphone (MIC). When the electronic device 600 is in an operation mode, such as a call mode, a recording mode, and a voice recognition mode, the microphone is configured to receive an external audio signal. The received audio signal can be further stored in the memory 604 or sent via the communication component 616. In the arrangements of the disclosure, the audio component 610 further includes a speaker for outputting audio signals.

The I/O interface 612 provides an interface between the processing component 602 and a peripheral interface module. The above-mentioned peripheral interface module may be a keyboard, a click wheel, a button, and the like. These buttons may include but are not limited to a home button, a volume button, a start button, and a lock button.

The sensor component 614 includes one or more sensors for providing the electronic device 600 with various aspects of status evaluation. For example, the sensor component 614 can detect the on/off status of the electronic device 600 and the relative positioning of the components. For example, the component is the display and the keypad of the electronic device 600. The sensor component 614 can also detect the electronic device 600, position change of any of the components in electronic device 600, the presence or absence of contact between the user and the electronic device 600, the orientation or acceleration/deceleration of the electronic device 600, and the temperature change of the electronic device 600. The sensor component 614 may include a proximity sensor configured to detect the presence of nearby objects when there is no physical contact. The sensor component 614 may also include a light sensor for use in imaging applications, such as a Complementary Metal Oxide Semiconductor (CMOS) image sensor or a Charge-coupled Device (CCD) image sensor. In the arrangements of the disclosure, the sensor component 614 may also include an acceleration sensor, a gyroscope sensor, a magnetic sensor, a pressure sensor or a temperature sensor.

The communication component 616 is configured to facilitate wired or wireless communication between the electronic device 600 and other devices. The electronic device 600 can access a wireless network based on a communication standard, such as WiFi, an operator network (such as 2G, 3G, 4G, or 5G), or a combination thereof. In an example arrangement, the communication component 616 receives a broadcast signal or broadcast related information from an external broadcast management system via a broadcast channel. In arrangements of the disclosure, the communication component 616 further includes a Near Field Communication (NFC) module to facilitate short-range communication. For example, the NFC module can be implemented based on Radio Frequency Identification (RFID) technology, Infrared Data Association (IrDA) technology, Ultra Wide Band (UWB) technology, Bluetooth (BT) technology and other Technology.

In an example arrangement, the electronic device 600 may be implemented by one or more Application Specific Integrated Circuits (ASIC), Digital Signal Processor (DSP), and Digital Signal Processor Device (DSPD), Programmable Logic Device (PLD), Field Programmable Gate Array (FPGA), controller, microcontroller, microprocessor or other electronic components, in order to perform the above methods.

In the arrangements of the disclosure, there is also provided a non-transitory computer-readable storage medium having instructions, such as the memory 604 including instructions, which can be executed by the processor 620 of the electronic device 600 to complete the foregoing method. For example, the non-transitory computer-readable storage medium may be ROM, Random Access Memory (RAM), Compact Disc Read-Only Memory (CD-ROM), magnetic tape, floppy disk, and optical data storage device, etc.

Figure 7:
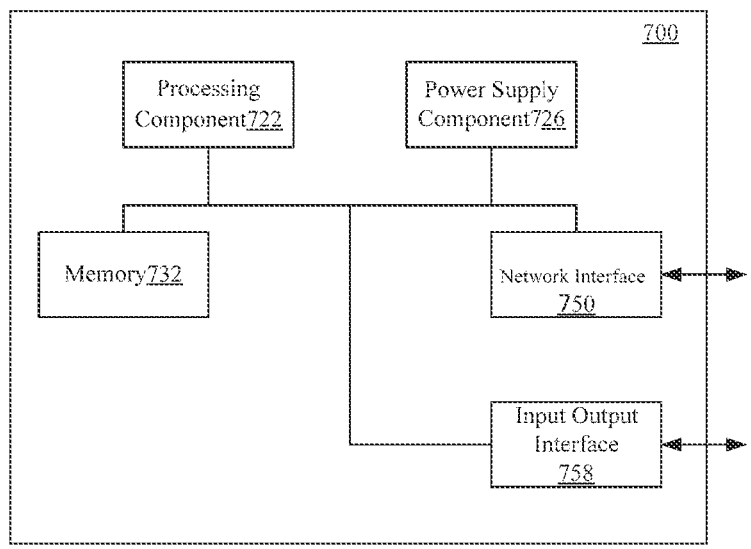
FIG. 7 is a block diagram showing a delay control apparatus for executing a method for controlling a delay according to an arrangement of the disclosure.

FIG. 7 is a block diagram showing a delay control apparatus 700 used in the above delay control method according to an example arrangement. For example, the apparatus 700 may be provided as a server. Referring to FIG. 7, the apparatus 700 includes a processing component 722, which further includes one or more processors, and a memory resource represented by a memory 732, for storing instructions executable by the processing component 722, such as an application program. The application program stored in the memory 732 may include one or more modules, each of the modules corresponds to a set of instructions. In addition, the processing component 722 is configured to execute instructions to execute the delay control method described above.

The apparatus 700 may also include a power supply component 726 configured to perform power supply management of the apparatus 700, a wired or wireless network interface 750 configured to connect the apparatus 700 to a network, and an input output (I/O) interface 758. The apparatus 700 can operate based on an operating system stored in the memory 732, such as Windows Server™, Mac OS X™, Unix™, Linux™, FreeBSD™ or the like.

The technical solutions provided by the arrangements of the disclosure may include the following beneficial effects:

In the method for controlling a delay of this disclosure, the network status of the user-side is determined according to the cached data at the user-side, and delay time is adjusted accordingly, so that in a large-scale live broadcast scenario, according to the network status of each user-side, the delay time of the each user-side can be controlled in real time and dynamically, which improves the user's experience of viewing.

The technical solution provided by another arrangement of the disclosure may include the following beneficial effects:

The current delay threshold of the client-side is adjusted according to the network status. In response to determining that the network status is good, the current delay threshold is lowered, and in response to determining that one or more stalls occur, the current delay threshold is increased, so that the user can follow up the live broadcast situation in time when the network is good. In response to determining that one or more stalls occur, the cache is adjusted in time to reduce the stalling rate, improve the viewing experience, and achieve real-time adjustment to ensure the user's viewing quality.

After considering the specification and practicing the arrangements disclosed herein, those skilled in the art will easily think of other arrangements of the disclosure. This application is intended to cover any variations, uses, or adaptive changes of this application. These variations, uses, or adaptive changes follow the general principles of this application and include common knowledge or customary technical means in the technical field not disclosed in this application. The Specification and arrangements are only regarded as example, and the true scope and spirit of the application are pointed out by the following claims.

It should be understood that the disclosure is not limited to the precise structure that has been described above and shown in the drawings, and various modifications and changes can be made without departing from its scope. The scope of the application is only limited by the appended claims.

What is claimed is:

1. A method for controlling a delay, comprising:
   initializing an amount of cached data, and setting an initial delay threshold;
   acquiring real-time cached data of a client-side and determining a network status of the client-side according to the real-time cached data;
   determining that the network status is good;
   reducing the current delay threshold, in response to the determining that the network status is good;
   presetting a delay adjustment time, and adjusting the current delay threshold according to the delay adjustment time; and
   selecting a larger one of a minimum amount of cached data in each sliding window and a difference between the current delay threshold and a multiple of the delay adjustment time as an adjusted delay threshold, in response to determining that the current delay threshold is reduced.

2. The method according to claim 1, further comprising:
   activating chasing frame logic until the amount of cached data is not greater than the current delay threshold, in response to determining that the amount of cached data is greater than the current delay threshold, and
   determining whether or not the stall occurs, after each of activations of the chasing frame logic.

3. The method according to claim 1, wherein the cached data comprises a video bitrate, an average download bandwidth, and the amount of cached data in each sliding window.

4. The method according to claim 3, wherein determining the network status, in response to a multiple relationship between a minimum amount of cached data in each sliding window and the current delay threshold, and a multiple relationship between the average download bandwidth and the video bitrate.

5. The method according to claim 4, wherein determining that the network status is good, in response to that the minimum amount of cached data in each sliding window is greater than or equal to a set multiple of the current delay threshold, and the average download bandwidth is greater than a set multiple of the video bitrate.

6. The method according to claim 5, wherein said the average download bandwidth is greater than the set multiple of the video bitrate comprising:
   for a single bitrate video, the average download bandwidth is greater than the set multiple of the video bitrate;
   for a multi-bitrate video, a minimum video bitrate in each sliding window is equal to a maximum available video bitrate and the average download bandwidth is greater than the set multiple of the video bitrate.

7. A terminal device configured to perform the method for controlling a delay according to claim 1, comprising:
   one or more processors;
   a memory for storing instructions executable by the one or more processors;
   wherein, when the instructions are executed by the one or more processors, the one or more processors are configured to:
   initialize an amount of cached data, and set an initial delay threshold;
   acquire real-time cached data of a client-side and determine a network status of the client-side according to the real-time cached data;
   reduce the current delay threshold, in response to determining that the network status is good;
   preset a delay adjustment time, and adjust the current delay threshold according to the delay adjustment time; and
   select a larger one of a minimum amount of cached data in each sliding window and a difference between the current delay threshold and a multiple of the delay adjustment time as an adjusted delay threshold, in response to determining that the current delay threshold is reduced.

8. The terminal device according to claim 7, wherein the one or more processors are configured to:
   activate chasing frame logic until the amount of cached data is not greater than the current delay threshold, in response to determining that the amount of cached data is greater than the current delay threshold, and
   determine whether or not the stall occurs, after each of activations of the chasing frame logic.

9. The terminal device according to claim 7, wherein the one or more processors are configured to:
   determine the network status, in response to a multiple relationship between a minimum amount of cached data in each sliding window and the current delay threshold, and a multiple relationship between an average download bandwidth and a video bitrate.

10. The terminal device according to claim 9, wherein the one or more processors are configured to:
    determine that the network status is good, in response to that the minimum amount of cached data in each sliding window is greater than or equal to a set multiple of the current delay threshold, and the average download bandwidth is greater than a set multiple of the video bitrate; otherwise, determine that the network status is general, and keep the current delay threshold unchanged, in response to determining that the network status is general and no stall occurs.

11. A non-transitory computer-readable storage medium having a computer instruction stored thereon, wherein when being executed, the computer instruction implements a method for controlling a delay, the method for controlling the delay comprising:
    initializing an amount of cached data, and setting an initial delay threshold;
    acquiring real-time cached data of a client-side and determining a network status of the client-side according to the real-time cached data;
    reducing the current delay threshold, in response to determining that the network status is good;
    presetting a delay adjustment time, and adjusting the current delay threshold according to the delay adjustment time; and
    selecting a larger one of a minimum amount of cached data in each sliding window and a difference between the current delay threshold and a multiple of the delay adjustment time as an adjusted delay threshold, in response to determining that the current delay threshold is reduced.

12. A method for controlling a delay, comprising:
    initializing an amount of cached data, and setting an initial delay threshold;
    acquiring real-time cached data of a client-side and determining a network status of the client-side according to the real-time cached data;
    determining that a stall occurs;
    increasing the current delay threshold, in response to the determining that the stall occurs;
    presetting a delay adjustment time, and adjusting the current delay threshold according to the delay adjustment time; and
    selecting a smaller one of a maximum amount of cached data in each sliding window and a sum between the current delay threshold and a multiple of the delay adjustment time as the adjusted delay threshold, in response to determining that the current delay threshold is increased.

13. The method according to claim 12, further comprising:
    activating chasing frame logic until the amount of cached data is not greater than the current delay threshold, in response to determining that the amount of cached data is greater than the current delay threshold, and
    determining whether or not the stall occurs, after each of activations of the chasing frame logic.

14. The method according to claim 12, wherein the cached data comprises a video bitrate, an average download bandwidth, and the amount of cached data in each sliding window.

15. The method according to claim 14, wherein determining the network status, in response to a multiple relationship between a minimum amount of cached data in each sliding window and the current delay threshold, and a multiple relationship between the average download bandwidth and the video bitrate.

16. A terminal device configured to perform the method for controlling a delay according to claim 12, comprising:
    one or more processors;
    a memory for storing instructions executable by the one or more processors;
    wherein, when the instructions are executed by the one or more processors, the one or more processors are configured to:
    initialize an amount of cached data, and setting an initial delay threshold;
    acquire real-time cached data of a client-side and determining a network status of the client-side according to the real-time cached data;
    increase the current delay threshold, in response to determining that a stall occurs;
    preset a delay adjustment time, and adjusting the current delay threshold according to the delay adjustment time; and
    select a smaller one of a maximum amount of cached data in each sliding window and a sum between the current delay threshold and a multiple of the delay adjustment time as the adjusted delay threshold, in response to determining that the current delay threshold is increased.

17. The method according to claim 16, the one or more processors are further configured to:
    activate chasing frame logic until the amount of cached data is not greater than the current delay threshold, in response to determining that the amount of cached data is greater than the current delay threshold, and
    determine whether or not the stall occurs, after each of activations of the chasing frame logic.

* * * * *